United States Patent [19]

Bindloss et al.

[11] Patent Number: 5,479,626
[45] Date of Patent: Dec. 26, 1995

[54] SIGNAL PROCESSOR CONTEXTS WITH ELEMENTAL AND RESERVED GROUP ADDRESSING

[75] Inventors: Keith M. Bindloss; Kenneth E. Garey, both of Irvine; John Earle, Tustin, all of Calif.

[73] Assignee: Rockwell International Corporation, Seal Beach, Calif.

[21] Appl. No.: 95,550

[22] Filed: Jul. 26, 1993

[51] Int. Cl.$^6$ .......................... G06F 12/04; G06F 12.06; G06F 15/78
[52] U.S. Cl. .................. 395/421.02; 395/800; 395/375; 395/421.1; 364/DIG. 1
[58] Field of Search ................................ 395/400, 425, 395/800, 775, 375

[56] References Cited

U.S. PATENT DOCUMENTS

| | | | |
|---|---|---|---|
| 4,021,655 | 5/1977 | Healey et al. | 395/375 X |
| 4,945,511 | 7/1990 | Itomitsu et al. | 395/375 |
| 5,148,528 | 9/1992 | Fite et al. | 395/375 |
| 5,220,656 | 6/1993 | Itomitsu et al. | 395/375 |
| 5,233,698 | 8/1993 | Zuk | 395/375 |
| 5,274,830 | 12/1993 | Asano | 395/775 |
| 5,276,891 | 1/1994 | Patel | 395/775 |
| 5,321,821 | 6/1994 | Itomitsu et al. | 395/375 |
| 5,355,462 | 10/1994 | Rousseau et al. | 395/400 |

*Primary Examiner*—Michael A. Whitfield
*Attorney, Agent, or Firm*—George A. Montanye; David J. Arthur; Tom Streeter

[57] ABSTRACT

The signal processor including a CPU 10 which selects a context register 16, the contents of which configure an address generator 20 and a data type converter 22. A narrow parameter from the CPU 10 produces a broad address for the generator 20 to pass to the memory 28. The converter 22 converts data between memory 28 format and CPU 10 format. A different context register 16 may be selected by each code line of software. The generator 20 preferably calculates a data element length which is the product of an odd number and a power of two, each number being specified in the content of the Context Register 16. Elements are clustered into groups, one group for each element length, and the groups are arranged in order of ascending element length. The index identifying the individual element of a group with a larger element length does not begin with zero (or one). Instead, the lowest index used is sufficiently large that the memory space which would have been occupied with lower indexed elements may instead be occupied by the groups of smaller element lengths.

4 Claims, 6 Drawing Sheets

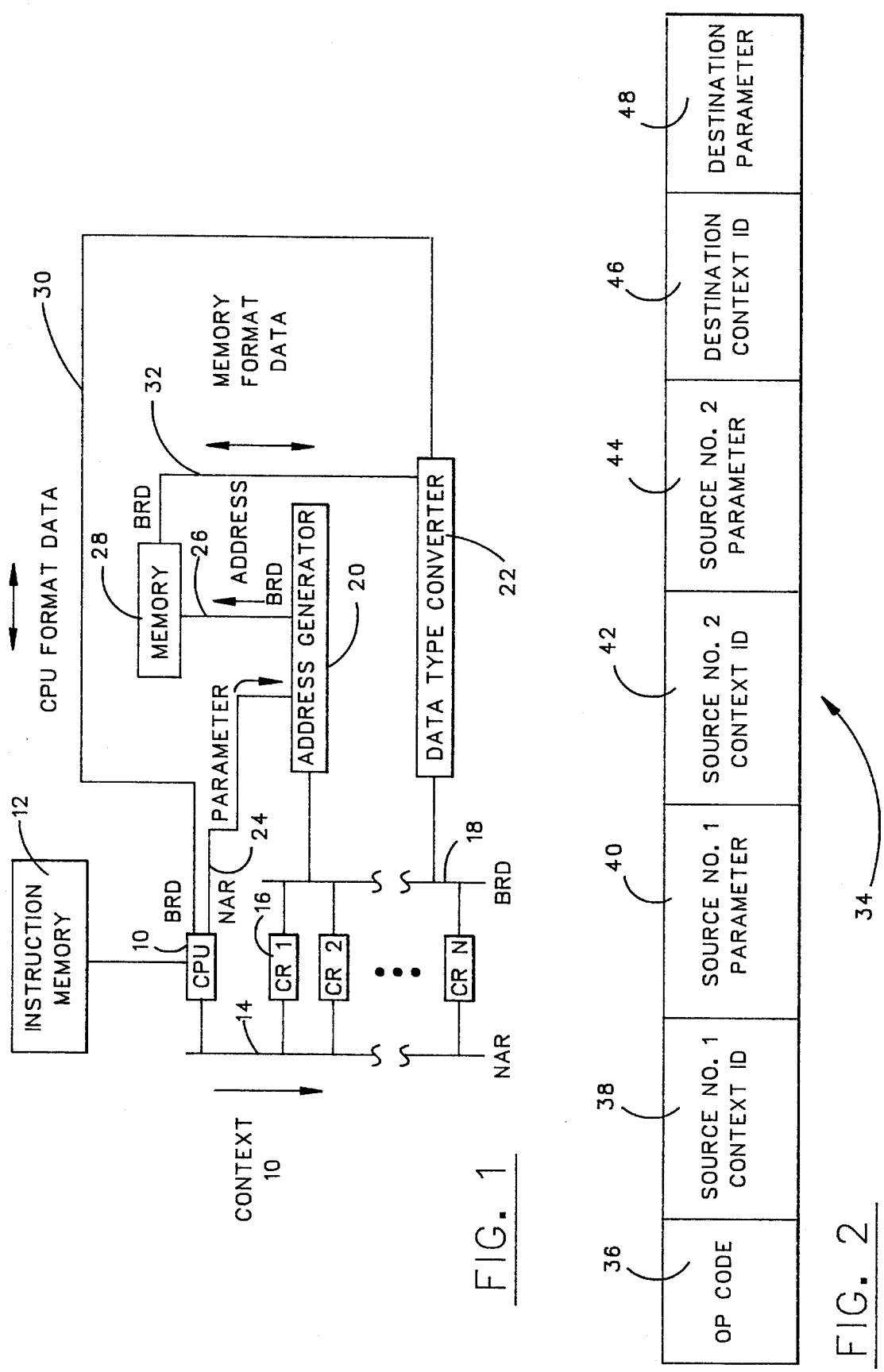

| DESIRED SIZE | REQUIRED SIZE | WASTE | % WASTE |
|---|---|---|---|
| 1 | 1 | 0 | 0 |
| 3 | 4 | 1 | 25 |
| 7 | 8 | 1 | 12 |
| 10 | 16 | 6 | 37 |
| 17 | 32 | 15 | 46 |
FIG. 3
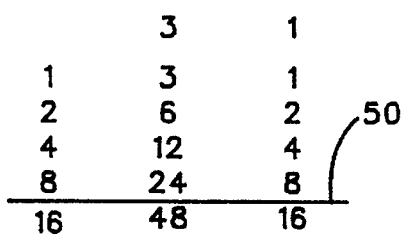
FIG. 4
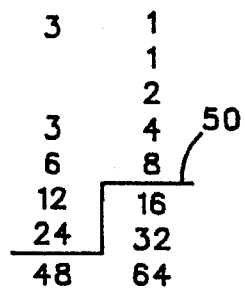
FIG. 5

| DESIRED SIZE | REQUIRED SIZE | WASTE | % WASTE |
|---|---|---|---|
| 1 | 1 | 0 | 0 |
| 3 | 3 | 0 | 0 |
| 7 | 8 | 1 | 12 |
| 10 | 12 | 2 | 16 |
| 17 | 24 | 7 | 29 |

| DESIRED SIZE | REQUIRED SIZE | WASTE | % WASTE |
|---|---|---|---|
| 1 | 1 | 0 | 0 |
| 3 | 3 | 0 | 0 |
| 7 | 7 | 0 | 0 |
| 10 | 10 | 0 | 0 |
| 17 | 20 | 3 | 15 |

| CODE | INDEX X | X*2+1 | BINARY |
|------|---------|-------|--------|
| 00   | 0       | 1     | 0 0 1  |
| 01   | 1       | 3     | 0 1 1  |
| 10   | 2       | 5     | 1 0 1  |
| 11   | 3       | 7     | 1 1 1  |

| CODE | SHIFT INDEX SH | 2^SH |
|------|----------------|------|
| 00   | 0              | 1    |
| 01   | 1              | 2    |
| 10   | 2              | 4    |
| 11   | 3              | 8    |

5,479,626

SIGNAL PROCESSOR CONTEXTS WITH ELEMENTAL AND RESERVED GROUP ADDRESSING

BACKGROUND OF THE INVENTION

The present invention relates to data access mechanisms in high performance computers, and has particular relation to such mechanisms which do their work without lengthening the instruction word which invokes them.

A central processing unit (CPU) needs to know how to proceed through an associated memory: use every address, use only a portion of an address and concatenate, skip a certain number of addresses under certain conditions, etc. It also needs to know the type of number it is dealing with: signed, unsigned, fixed point, floating point, etc. These pieces of needed information are called the context in which the memory is being processed. If very long lines of software can be tolerated, the context can be specified anew in each line, allowing great flexibility. If strict limitations on context changing are imposed, software code lines may be made quite short, allowing great simplicity of operation. It has not yet been possible to do both.

SUMMARY OF THE INVENTION

It is an objective of the present invention to provide both flexibility and simplicity. This objective is attained by providing a limited number of context registers, the voluminous contents of each configuring two pieces of hardware separate from the CPU: an address generator and a data type converter. The CPU drives the memory indirectly through the generator and converter. Changing the context requires no more than specifying a new context register, the contents of which may have been specified long previously, at the beginning of the program. "Program", as used throughout the present disclosure, includes "subprogram" numbers may be loaded into the context registers a single time, then used many times.

If data come in elements of varying lengths, the length of the data element may be included within the context register.

Elements should be clustered into groups, one group for each element length. The groups should be arranged in order of ascending element length. The index identifying the individual element of a group with a larger element length should not begin with zero (or one). Instead, the lowest index used should be sufficiently large that the memory space which would have been occupied with lower indexed elements may instead be occupied by the groups of smaller element lengths.

BRIEF DESCRIPTION OF THE DRAWINGS

FIG. 1 is a block drawing of apparatus embodying the present invention.

FIG. 2 is a block drawing of a line of software code used in the present invention.

FIG. 3 is a table showing how memory is wasted when data element lengths are not integral powers of two.

FIG. 4 is a two by two multiplication table illustrating a solution to the problem shown in FIG. 3.

FIG. 5 is a recast version of FIG. 4, with the table elements in ascending order.

FIG. 6 shows the reduction of waste engendered by the use of FIGS. 4 and 5.

FIGS. 7 and 8 are comparable to FIGS. 4 and 5, but use a three by three table.

DETAILED DESCRIPTION OF THE DRAWINGS

Figures 9, 10, 11:
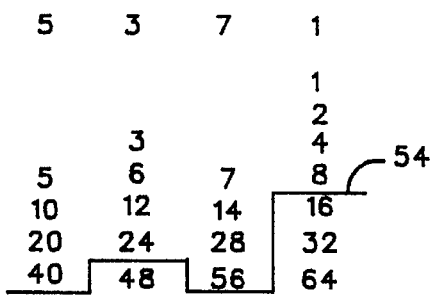
FIGS. 9, 10, and 11 are comparable to FIGS. 4, 5, and 6, but use a four by four table.

In FIG. 1, a CPU 10 receives instructions from an instruction memory 12. The CPU 10 sends a context ID over an I D bus 14, thereby selecting a context register 16. There are N context registers 16, shown as CR 1 through CR N. N is a relatively small number, perhaps only 16. The I D bus 14 may therefore be fairly narrow, perhaps only 4 bits wide. This narrowness is indicated by the expression NAR at the base of the I D bus 14.

The context registers 16 are considerably wider than the I D bus 14, and contain perhaps 80 bits. All 80 bits from the selected context register 16 are read out onto a context bus 18. This bus 18 must be at least as many bits wide as the register 16. This breadth of bus 18 is indicated by the expression BRD at its base. The context registers may be permanently loaded by embedding them in a ROM, but it is preferred to customize their contents by loading them at the beginning of each program. It is especially efficient to load the registers at the start of a loop. Such loading in a finite impulse response filter, for example, allows the inner loop to be executed with fewer instructions per loop.

The context bus 18 drives an address generator 20 and a data type converter 22. The address generator 20, having been properly configured by the contents of the selected context register 16, receives a narrow (NAR) parameter, perhaps only 3 bits wide, from the CPU 10 on a parameter line 24, and sends the full, broad (BRD) address on an address line 26 to the memory 28. For example, the address generator 20 may retain the last address accessed. A parameter of 1 may indicate "Do not increment the last address", a parameter of 2 may indicate "Increment the last address by the amount shown in bits 20–27 of the context register", and a parameter of 3 may indicate "Increment the last address by the amount shown in bits 35–49 of the context register". Parameters of 4 through 7 may indicate, respectively, "Increment by 1", "Increment by 2", "Decrement by 1", and "Decrement by 2". The meaning of each parameter is determined by the contents of the selected context register 16.

The data type converter 22 is similar. When the CPU 10 requests or produces data on a CPU data line 30, it does so in a CPU format which may or may not be the same as the format used by the memory 28. The data type converter 22 is therefore placed between the CPU 10 and memory 28, connecting with them by CPU data line 30 and memory data line 32. These lines 30 and 32 are both fairly broad. No substantial data compression is accomplished, after all, by (for example) converting a signed number to an unsigned number. In some situations the data type converter 22 may also act as a data compressor/decompressor, such as when the CPU 10 operates in binary but the memory 28 operates in binary coded decimal, or when the CPU 10 operates on 32 bit words whereas data is stored in the memory 28 as 8 bit bytes.

FIG. 2 shows this flexibility. A line of code 34 begins with an operation code in its first few bits 36. The op code usually requires only a few bits, since it usually has a complexity on the order of only "Add a first source operand to a second source operand to produce a destination operand." The first operand has a context I D to be placed on the I D bus 14, and this I D is contained in the second field 38 of the line 34. This I D, as has been noted above, is only a few bits wide.

The parameter to be fed to the address generator is contained in the third field 40. This also takes only a few bits. Fourth through seventh fields 42–48 similarly contain the few bits needed to specify the context I D and address parameter for the second source operand and for the destination operand. Thus, a great deal of information can be specified in a single, short line 34 of software through the expedient of storing the specified information in hardware. Further, the hardware may be changed, from line to line in the software, through the expedient of specifying a new context register with each line.

Most importantly, a block of code may be reused in a new program without any modification whatsoever, even though the new program is completely different, even though it is to be run on an entirely different machine, even though it has an entirely different set of offsets for selecting the next memory address to be accessed, even though the CPU operates on numbers which are in an entirely different format, even though the memory operates on numbers in an entirely different format, and even though the context registers are of an entirely different length. All this is taken care of by loading the correct numbers into the context registers 16 at the beginning of the new program. Alternatively, the numbers may be loaded within a program, but before a subroutine is called. In either event, the loading may take place long before the imported block of code is ever encountered.

Elemental Addressing

The foregoing principles may be effectively applied to solve an old problem: How do we address variable length, packed data of arbitrarily large size? The length of the element of data (or, at least, an index indicating the length of the data element) may be included in the context register. This is relatively straightforward when the length of the data element is an integral power of two. Non-integral powers of two require a more complex structure.

FIG. 3 shows the problem. Data may come in a desired element length which is not an integral power of two. However, the memory in which the data is to be stored may require an element length which is an integral power of two. This has the desirable feature that the power may be passed to the memory in only two or three bits. It also has the undesirable feature that much of the memory may be wasted. This waste is not required, as is shown in the top line of FIG. 3, but it is common and, as is shown In the bottom line of FIG. 3, may approach 50%. (All waste percentage figures have been rounded to the next lower whole percent for clarity of understanding.)

FIG. 4 shows how this problem may be at least partially alleviated. FIG. 4 is a multiplication table, but only odd numbers are shown on the top row, and only integral powers of two are shown in the left column. Line 50 is a cut off line, drawn so that only two bits are required to select the desired column from the left column.

FIG. 5 recasts FIG. 4 (and puts a kink into cut off line 50) so that increasing numbers are read as one reads a page, that is, top to bottom and left to right.

FIG. 6 is comparable to FIG. 3, and shown the reduction of waste which may be obtained when the numbers of FIG. 5 are available as required element lengths, that is, when the memory is not restricted to element lengths which are integral powers of two. This reduction of waste is accomplished without increasing the number of bits needed to specify the element length. In FIG. 3, the left column has five elements, which requires three bits to specify the desired element. In FIGS. 4 and 5, only one bit is required to specify the odd number, and only two bits are required to specify the power of two.

FIGS. 7 and 8 are comparable to FIGS. 4 and 5, but show a three by three multiplication table. FIG. 8 shows that two kinks appear in the cut off line 52, but this is of no importance. What is important is that the number of bits needed to specify the odd number has doubled, while the number of available element lengths has increased by only an eighth.

FIG. 9 expands FIG. 7 to a four by four table with a cut off line 54. FIG. 10 recasts FIG. 9, rearranging the column order as needed and putting a reverse Kink in the cut off line 54. As in FIG. 8, the shape of the cut off line is of no importance. What is important is that, at the expense of only one additional bit to specify the odd numbers, the number of available element lengths has doubled. FIG. 11 shows the corresponding dramatic drop in memory waste.

Figures 12, 13, 14:
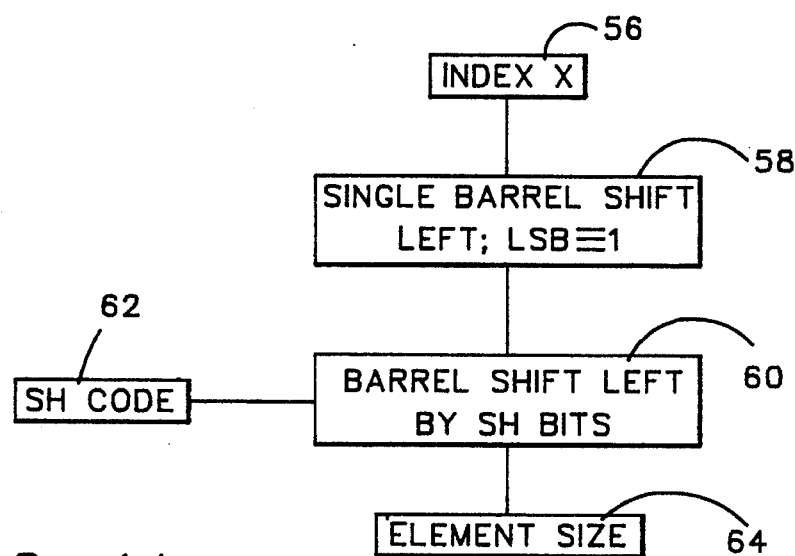
FIG. 12 is a table for encoding the top row of FIG. 9.
FIG. 13 is a table for encoding the left column of FIG. 9.
FIG. 14 is a block diagram of a mechanization of the method shown in FIGS. 9, 12, and 13.

FIG. 12 shows how odd numbers may be encoded. The desired odd number appears in the third column, and the index X which encodes it appears in the second. The binary code for the index X appears in the first column, and the binary code for the odd number appears in the fourth column.

In FIG. 13, a shift index SH is encoded in binary, and the corresponding power of two is also shown.

FIG. 14 shows a block-diagram mechanization of the method shown in FIGS. 12 and 13. The index X 56 is fed to a first barrel shifter 58, which shifts the index X 56 one place to the left and hard-wires the least significant bit to one. A second barrel shifter 60 receives the output of the first barrel shifter 58, along with the SH code 62, and barrel shifts the output SH bits to the left, thereby producing the element length 64.

Returning to FIG. 1, the four bits needed to specify the element length 64 are included within the selected context register 16. The address generator 20 includes the apparatus of FIG. 14. The parameter passed to the address generator 20 from the CPU 10 on the parameter line 24 selects the offset included in the context register 16. The address generator 20 multiplies this offset by the element length, divides by the number of bits per address in the memory 28, increments the address by that amount, and passes the address to the memory 28.

If the element length is less than an address length, the data type converter 22 strips off the unneeded bits and passes on the desired bits to the CPU 10. If the element crosses an address boundary, or is longer than an address length, the data type converter concatenates together the data found at the necessary number of consecutive addresses, strips off the unneeded bits, and again passes the desired bits to the CPU.

It Is thus seen that elemental addressing is a subset of object oriented programming techniques. It allows an assembly language programmer to access arrays of data as the fundamental elements (hence the name) to be processed. The assembly language programmer is not required to access the data as having some memory-specific length, and to then manipulate the data into elements. This reduces cognitive load without imposing any performance penalty. Indeed, performance can be increased: the manipulations required to convert raw memory data into elements can be performed on-the-fly.

These benefits are accompanied by additional benefits. Data may be stored efficiently in the memory. Code can be re-used; that is, the same instruction or routine can operate on data of different length. Elemental addressing can be incorporated into a CPU architecture. Elemental addressing can be efficiently encoded; It is a floating point addressing scheme which uses fewer shifts and adds than are required with full-up floating point hardware. The cost of providing elemental addressing hardware must be balanced against the savings created by lower memory requirements. However, even when memory is plentiful and cheap, the other advantages of elemental addressing may dictate its use.

A further benefit of elemental addressing is that relatively large memories may be completely accessed using addresses which have a relatively small number of bits. A gigabyte sized memory, for example, requires 30-bit addressing if every byte In the memory is to be separately accessed. When data is to be read from, or written to, a memory in the gigabyte range, It may only need to be read or written In elements having a size of a kilobyte or even larger.

This fact presents a design opportunity. The memory, instead of being viewed as a giga-byte memory, is more conveniently viewed as a mega-element memory. Thus, instead of addressing each byte, it is more convenient to only address each data element. If every element in this memory has a size of a kilobyte, then 20-bit addressing (typical for a megabyte sized memory) is sufficient. If many of the elements have sizes smaller than a kilobyte, then somewhat more than 20 bits (but still substantially less than 30 bits) of addressing are required. On the other hand, the address size effect of the sub-kilobyte elements may be more than outweighed by elements having a size of more than a kilobyte. This will hold constant, or even reduce, the number of bits required in the address. It is an important feature of the present invention that elements of a large number of sizes may be accommodated in a single memory, even when the largest size is substantially larger than the smallest. The larger memories become, the greater the benefits of elemental addressing.

Reserved Group Addressing

Applicants have developed a data structure which may be conveniently described as reserved group addressing. Any memory may be structured using reserved group addressing, but a reserved group structured memory is most effective when used with contexts.

It is convenient to have all data elements of the same length grouped together contiguously. The physical address of the lowest bit of the lowest data element in the group then becomes a base address from which the physical address of each data element in the group may be determined.

Base relative addressing requires, however, that space be reserved in the context register for the base address of each group, and further requires the extra step of adding the generated address to the base address to obtain the physical address. This overhead may be eliminated by reserved group addressing.

Figure 15:
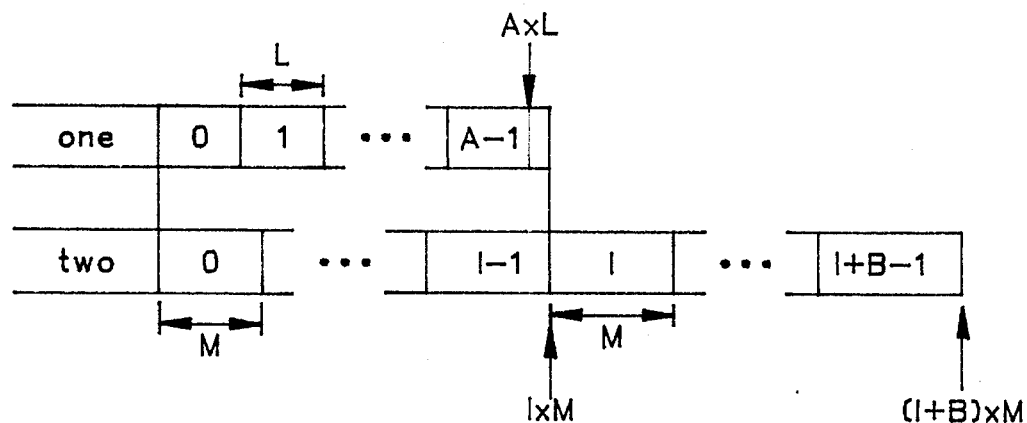

Suppose that there are only two groups. As shown in FIG. 15, group one has A elements, each of length L, and group two has B elements, each of length M. The first A×L bits are reserved for group one. If this happens to be an integral multiple of M, well and good. If not, reserve the first I×M elements for group one, where I is an integer and I×M is the integral multiple of M next greater than A×L.

When indexing the data elements of group two, do not use the first I elements, that is, those elements with indices from 0 to I−1. These indices are reserved for group one. Instead, begin with I, and use indices from I to I+B−1. This may increase the number of bits required to specify the greatest index, but this increase will generally be marginal and may not occur at all. Moreover, this modest drawback will usually be smaller than the drawbacks imposed by offset addressing.

Figure 16:
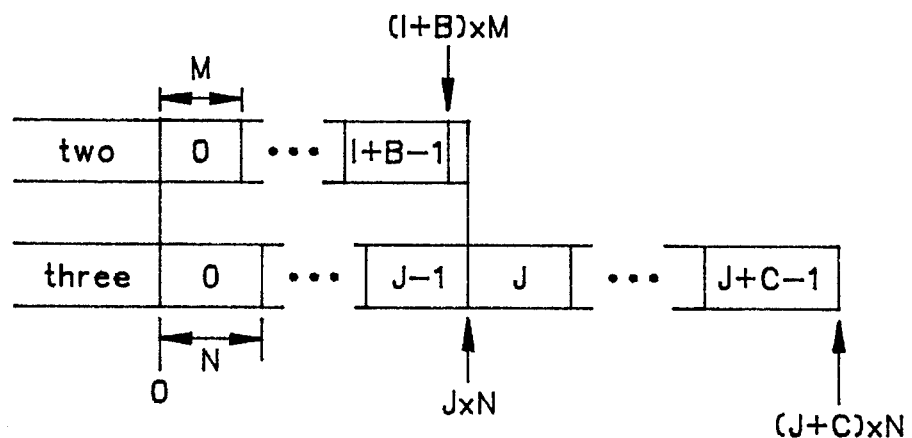

Suppose, as shown in FIG. 16, that there is a third group, with C elements, each of length N. The first (I+B)×M bits are reserved for group two (including group one). Let J be an integer such that J×N is the integral multiple of N which is equal to, or next greater than, (I+B)×M. When indexing the data elements of group three, do not use the first 3 elements, that is, those elements with indices from 0 to J−1. Instead, begin with J, and use indices from J to J+C−1. This process may be continued indefinitely.

Industrial Applicability

The present invention can be used whenever it is desired to provide flexibility of computer operation without unduly lengthening the length of software code lines. It has particular application to RISC CPU's, where the fixed instruction size and limited number of instruction formats would otherwise restrict the functionality of instructions. In can be made of components which, taken separate and apart from one another, are entirely conventional, or it can be made from their non-conventional analogs.

While a particular embodiment of the present invention has been stated in some detail, the true spirit and scope of the same are not limited thereto, but are limited only by the appended claims.

What is claimed is:

1. A signal processor, comprising:
   (a) a central processing unit (CPU);
   (b) a plurality of context registers connected to the CPU such that exactly one context register is selected by the CPU at any one time for each operand required;
   (c) a memory;
   (d) an address generator configured by a content of the selected context register to generate and pass on to the memory an address in response to a parameter passed to the generator by the CPU; the address depending on both the parameter and on the content of the selected context register; and
   (e) a data type converter connected to the selected context register; the converter being configured by the content of the selected context register to convert data between a CPU format and a memory format; and the converter being connected to the CPU to pass data to and from the CPU in CPU format only, and being connected to the memory to pass data to and from the memory in memory format only.

2. A signal processor, comprising:
   (a) a central processing unit (CPU);
   (b) a plurality of context registers connected to the CPU such that exactly one context register is selected by the CPU at any one time for each operand required;
   (c) a memory;
   (d) an address generator configured by a content of the selected context register to generate and pass on to the memory an address in response to a parameter passed to the generator by the CPU, the address depending on both the parameter and on the content of the selected context register, wherein the address generator includes:
  (1) means for receiving a context having a first field and a second field, the first field indicating a selected odd number and the second field indicating a selected power of two; and
  (2) means for producing the product of the odd number and the power of two; and
(e) a data type converter connected to the selected context register; the converter being configured by the content of the selected context register to convert data between a CPU format and a memory format: and the converter being connected to the CPU to pass data to and from the CPU in CPU format only, and being connected to the memory to pass data to and from the memory in memory format only.

3. The signal processor of claim 2, wherein the means for producing the product of the odd number and the power of two comprises:
  (a) a first barrel shifter, constructed to barrel shift an index for the odd number one bit to the left, and including means for hard-wiring the least significant bit to one, thereby producing the odd number; and
  (b) a second barrel shifter, constructed to barrel shift the odd number as many bits to the left as is indicated by an index for the power of two.

4. A signal processor, comprising:
(a) a central processing unit (CPU);
(b) a plurality of context registers connected to the CPU such that exactly one context register is selected by the CPU at any one time for each operand required;
(c) a memory;
(d) an address generator configured by a content of the selected context register to generate and pass on to the memory an address in response to a parameter passed to the generator by the CPU; the address depending on both the parameter and on the content of the selected context register, wherein the address generator is configured by a content of the selected context register to generate and pass to the memory a data element address selected to allow all data elements having a length smaller than a length of the addressed data element to reside in memory locations which are determined by an index smaller than a smallest index used by any data element having a length equal to the length of the addressed data element; and
(e) a data type converter connected to the selected context register; the converter being configured by the content of the selected context register to convert data between a CPU format and a memory format: and the converter being connected to the CPU to pass data to and from the CPU in CPU format only, and being connected to the memory to pass data to and from the memory in memory format only.

* * * * *